July 12, 1932.  G. E. HUGHES ET AL  1,867,076
DISTILLATION OF WATER
Filed Feb. 13, 1930   2 Sheets-Sheet 1
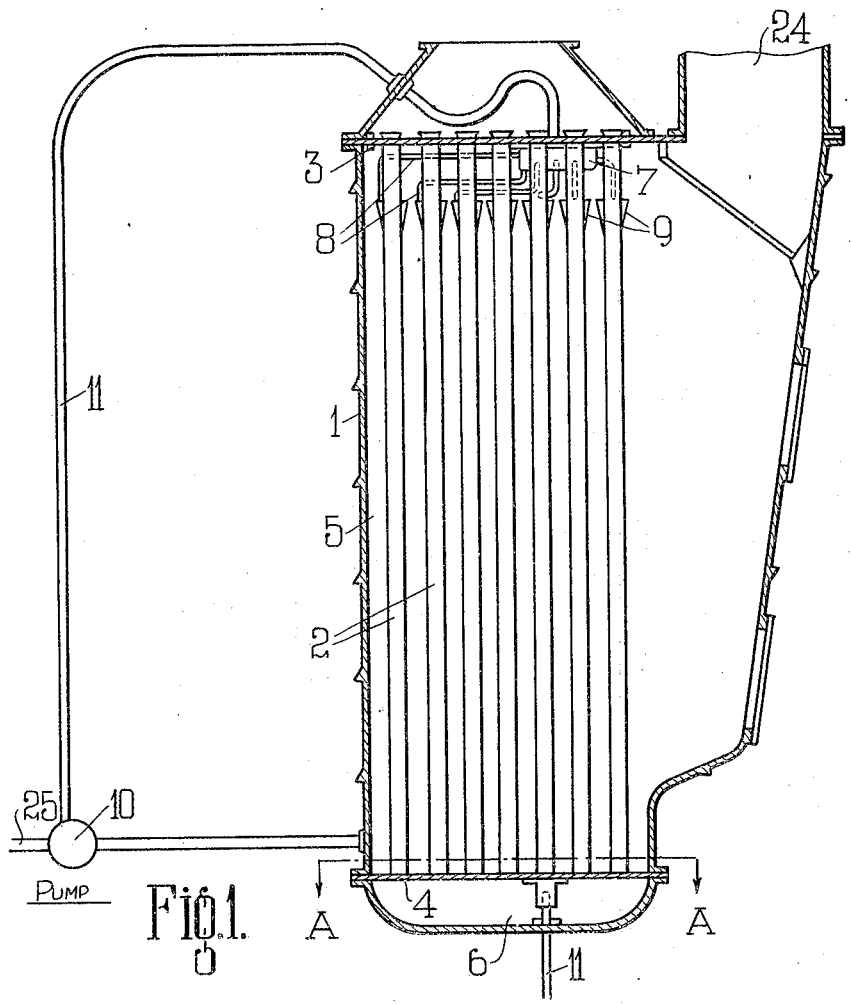
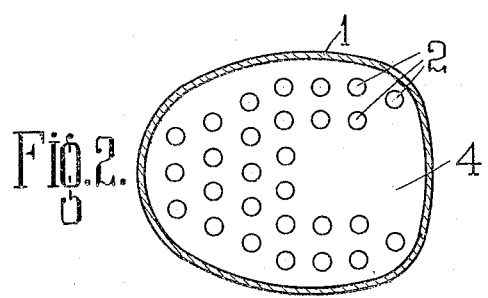

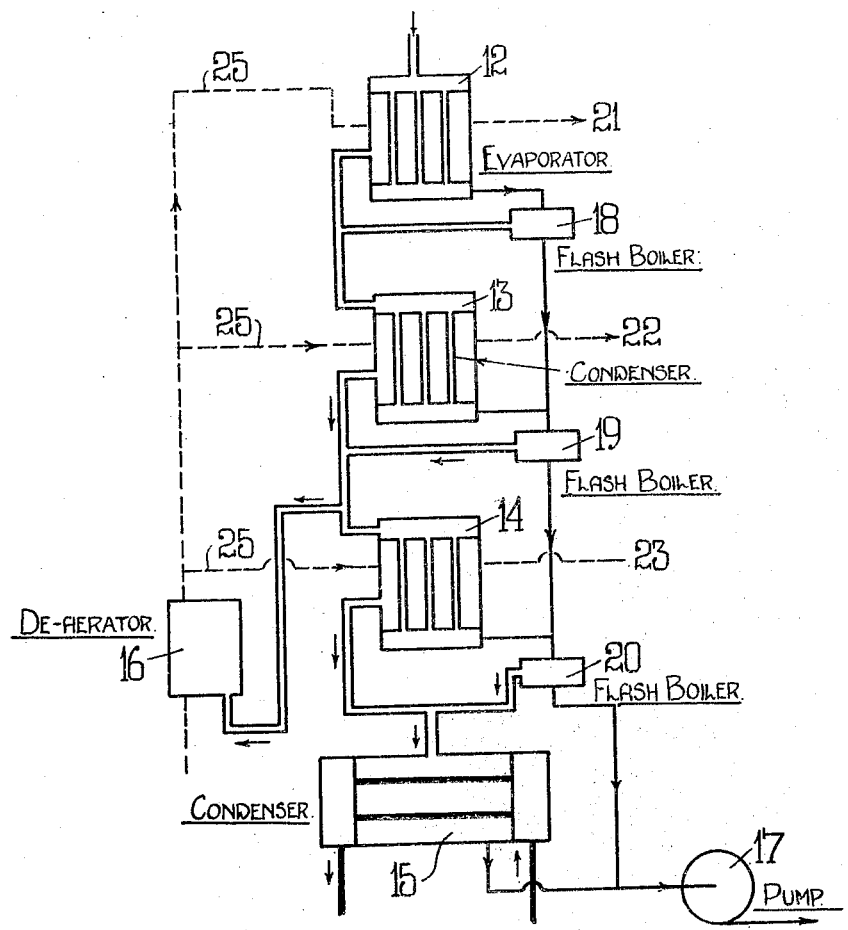

Patented July 12, 1932

1,867,076

UNITED STATES PATENT OFFICE

GUY ERSKINE HUGHES, ALFRED HAROLD WARING AND JOHN EDGAR BRAHAM, OF NORTON-ON-TEES, ENGLAND, ASSIGNORS TO IMPERIAL CHEMICAL INDUSTRIES LIMITED, OF LONDON, ENGLAND, A BRITISH COMPANY

DISTILLATION OF WATER

Application filed February 13, 1930, Serial No. 428,120, and in Great Britain February 14, 1929.

The present invention relates to improvements in the production of distilled water and has for its object to provide a novel and efficient process and apparatus to that end.

In specification #279,526 a distillation process is described which consists in exposing a freely falling film of liquid to a source of heat and optionally condensing the vapours by means of a similar film of liquid and we have now found that this process is peculiarly well applicable to the production of distilled water, especially when a multiple stage evaporation process is employed, as hereinafter described.

The apparatus for carrying out the present process, which will now be described, consists, in so far as it is novel of several identical units.

Each unit comprises a plurality of straight vertical tubes, mounted between end plates in a casing. Just below the upper end plate each tube is provided with a liquid supply (which may consist of a siphon pipe attached to a common supply tank) and a liquid distributor to distribute the liquid around the tube.

The liquid which remains unevaporated after circulating down the outside of the tubes may be collected on the lower end plate and returned, by means of a pump to the liquid distributors.

The process will now be described for simplicity's sake in its application to a three stage distillation plant, though as a matter of fact, in actual practice as many as seven or eight stages may be employed. The raw water is pumped through a deaerator and heater (which is heated as subsequently explained, by part of the steam produced in the second stage) into a common raw water supply main connected to all three stages of the distilling plant.

From this it passes to the evaporators which are the same as above described.

The first evaporator is fed with steam from an external source. This is condensed by indirect contact with the raw water, and passes, through a flash-boiler to the common distilled water main.

The purpose of the flash boiler is to collect the steam evolved during the release of pressure on the water which accompanies its passage into the distilled water main.

The steam evolved in the flash boiler passes, along with the steam evolved during the first stage, into the second stage evaporator.

Here it serves to evaporate a further quantity of hot raw water and is itself condensed and flows into the distilled water main. The steam from the second stage evaporator is in part used to preheat the entering water, is condensed thereby, and passes to the distilled water main.

The steam from the third stage evaporator is led off to a condenser, supplied with water from an external source. The whole of the distilled water is then drawn off by an extraction pump.

Theoretically a given weight of steam should produce in a three stage evaporator, nearly four times its weight of total distilled water. Actually, owing to radiation losses, this does not happen and the ratio is in fact nearer three.

Blow down lines should be provided to the evaporators, as a certain amount of blowing down is needed to keep the tubes of the evaporator clean.

Instead of steam the heating agent for the first stage may be gases of combustion.

The invention is illustrated in the accompanying drawings.

Figure 1 is a sectional elevation of a single unit.

Figure 2 a plan on the line A—A of Figure 1.

Figure 3 is a diagrammatic view of the plant as a whole.

Referring now to Figure 1, 1 is a shell built of metal plates and contains a nest of vertical tubes 2 extending between the tube plates 3 and 4 which divide off the steam and distilled water compartments 5 and 6.

Water supplied by pipe 25 is circulated by pump 10 from the bottom (above the tube plate 4) of 1 up through pipe 11 and into supply tank 7 from which it passes through siphon pipe 8 to the external distributors 9 and so down the outside of the tubes. Steam passes off at 24 and distilled water at 11.

In Figure 3 the course of the raw water is shown by dotted lines, the course taken by the distilled water by thin full lines, that taken by the condensing water by thick full lines and that of the steam by double lines. The pumps 10 and the details of the evaporators are not shown.

The plant consists of three evaporators 12, 13, 14, a condenser 15, a de-aerator and heater 16, an extraction pump 17 and flash boilers 18, 19, 20.

21, 22, 23 are blow-down lines.

We declare that what we claim is:—

1. An apparatus for the distillation of water comprising a plurality of evaporators, connected in series and in multiple effect, a plurality of main steam pipes between successive effects, a plurality of flash boilers each adapted to receive condensate from a separate effect, and each having a steam pipe joining the main steam pipe between successive effects, a condensed water main connecting all of said flash boilers and an extraction pump on said condensed water main.

2. An apparatus as set forth in claim 1 in which the evaporators are vertical film evaporators.

3. An apparatus as set forth in claim 1 comprising in addition a de-aerator connected to the main steam pipe of the penultimate effect.

In witness whereof, we have hereunto signed our names this 30th day of January, 1930.

GUY ERSKINE HUGHES.
ALFRED HAROLD WARING.
JOHN EDGAR BRAHAM.